US012804789B2

(12) United States Patent
Peng

(10) Patent No.: US 12,804,789 B2
(45) Date of Patent: Nov. 17, 2026

(54) METHOD OF CONTROLLING LIGHT-EMITTING DIODE LIGHT STRING

(71) Applicant: SEMISILICON TECHNOLOGY CORP., New Taipei City (TW)

(72) Inventor: Wen-Chi Peng, New Taipei City (TW)

(73) Assignee: SEMISILICON TECHNOLOGY CORP., New Taipei City (TW)

( * ) Notice: Subject to any disclaimer, the term of this patent is extended or adjusted under 35 U.S.C. 154(b) by 183 days.

(21) Appl. No.: 18/413,397

(22) Filed: Jan. 16, 2024

(65) Prior Publication Data

US 2025/0234443 A1 Jul. 17, 2025

(51) Int. Cl.

*H05B 47/175* (2020.01)
*H05B 47/105* (2020.01)
*H05B 47/155* (2020.01)
*H05B 45/40* (2020.01)

(52) U.S. Cl.

CPC ......... *H05B 47/198* (2024.01); *H05B 47/105* (2020.01); *H05B 47/155* (2020.01); *H05B 47/1965* (2024.01); *H05B 45/40* (2020.01)

(58) Field of Classification Search

CPC .. H05B 47/105; H05B 47/155; H05B 47/198; H05B 47/1965; H05B 45/40
See application file for complete search history.

(56) References Cited

U.S. PATENT DOCUMENTS

| | | | | |
|---|---|---|---|---|
| 11,546,981 | B1 * | 1/2023 | Peng | H05B 47/155 |
| 2011/0260654 | A1 * | 10/2011 | Tanigawa | H05B 47/125 315/313 |
| 2020/0053270 | A1 * | 2/2020 | Zhang | H04N 1/00864 |
| 2022/0114884 | A1 * | 4/2022 | Knapp | H05B 47/1965 |
| 2022/0272818 | A1 * | 8/2022 | Lee | H05B 47/155 |

FOREIGN PATENT DOCUMENTS

| | | | | | |
|---|---|---|---|---|---|
| CN | 105358938 | A | | 2/2016 | |
| CN | 108462534 | A | | 8/2018 | |
| CN | 110798955 | A | * | 2/2020 | |
| TW | 202234944 | A | | 9/2022 | |
| WO | WO-2015001444 | A1 | * | 1/2015 | G01S 1/70 |

OTHER PUBLICATIONS

Machine Translation of CN110798955A. (Year: 2020).*
Office Action dated Nov. 20, 2024 of the corresponding Taiwan patent application No. 112148089.

* cited by examiner

*Primary Examiner* — Alexander H Taningco
*Assistant Examiner* — Pedro C Fernandez
(74) *Attorney, Agent, or Firm* — MUNCY, GEISSLER, OLDS & LOWE, P.C.

(57) ABSTRACT

A method of controlling an LED light string includes steps of: executing an automatic encoding procedure: providing an encoding signal by a control unit for a plurality of LED modules to determine the sequence on the LED light string to complete the automatic encoding; executing a device linking procedure: linking a mobile device to the control unit; executing an image positioning procedure: operating an image capture unit of the mobile device to capture images of locations of the LED modules; executing a light control procedure: operating the mobile device to provide a light control signal to the control unit so as to control specified lighting actions of the specified LED modules by the control unit according to the light control signal.

11 Claims, 12 Drawing Sheets

METHOD OF CONTROLLING LIGHT-EMITTING DIODE LIGHT STRING

BACKGROUND

Technical Field

The present disclosure relates to a method of controlling a light-emitting diode (LED) light string, and more particularly to a method of controlling a LED light string based on an image capture.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

According to the present technology, in order to drive the LEDs of the LED light string to diversify light emission, the LEDs have different address sequence data. The LEDs receive light signals including light data and address data. If the address sequence data of the LEDs are the same as the address data of the light signals, the LEDs emit light according to the light data of the light signals. If the address sequence data of the LEDs are not the same as the address data of the light signals, the LEDs ignore the light data of the light signals.

At present, most of the LED sequence methods of the LED light string are complicated and/or difficult. For example, before the LEDs are combined into an LED light string, it is necessary to burn different address sequence data for each LED. Afterward, the LEDs are sequentially arranged and combined into the LED light string according to the address sequence data. If the LEDs are not arranged in sequence according to the address sequence data, the diversified light emission of the LEDs cannot be correctly achieved.

Furthermore, how to enable operators to operate and control diverse lighting modes and effects of the LED light strings more intuitively and conveniently remains to be further developed.

Therefore, how to design a method of controlling the LED light string to solve the problems and technical bottlenecks in the existing technology has become a critical topic in this field.

SUMMARY

An objective of the present disclosure is to provide a method of controlling a light-emitting diode (LED) light string to solve the problems and technical bottlenecks in the existing technology.

In order to achieve the above-mentioned objective, the present disclosure provides a method of controlling a LED light string. The LED light string includes a plurality of LED modules and a control unit. The method includes steps of: executing an automatic encoding procedure: providing an encoding signal by the control unit for the plurality of LED modules to determine the sequence on the LED light string to complete the automatic encoding; executing a device linking procedure: linking a mobile device to the control unit; executing an image positioning procedure: operating an image capture unit of the mobile device to capture images of locations of the LED modules; executing a light control procedure: operating the mobile device to provide a light control signal to the control unit so as to control specified lighting actions of the specified LED modules by the control unit according to the light control signal.

In one embodiment, in the image positioning procedure, a location information of the locations of the plurality of LED modules is generated according to the results of capturing images.

In one embodiment, the location information is a graphical information or a textual information.

In one embodiment, in the light control procedure, specified lighting actions of specified LED modules are controlled.

In one embodiment, the plurality of LED modules forms a series-connected LED light string, and the automatic encoding procedure is a series-connected automatic encoding procedure correspondingly.

In one embodiment, in the series-connected automatic encoding procedure, the sequence of the plurality of LED modules is determined according to different time difference values to achieve the automatic encoding.

In one embodiment, the method further includes steps of: initially controlling a working voltage of each of the LED modules to less than an identification voltage to build a start reference time; controlling the working voltage of each of the LED modules to gradually rise, and generating a plurality of time difference values from the start reference time when the working voltage rises to the identification voltage after the LED module operates.

In one embodiment, the time difference values are compared with a plurality of time difference ranges to determine the sequence of the LED modules.

In one embodiment, the plurality of LED modules forms a parallel-connected LED light string, and the automatic encoding procedure is a parallel-connected automatic encoding procedure correspondingly.

In one embodiment, in the parallel-connected automatic encoding procedure, the sequence of the plurality of LED modules is determined according to different voltages generated by the plurality of LED modules to achieve the automatic encoding.

In one embodiment, the method further includes steps of: connecting to the plurality of LED modules through a power wire having a plurality of wire resistances, and each LED module includes an impedance component providing an impedance characteristic; receiving a supply power by the plurality of LED modules; generating different voltages on the plurality of LED modules by the supply power passing through the plurality of wire resistances and the impedance components so that the plurality of LED modules are encoded.

Accordingly, the proposed method of controlling the LED light string can simplify circuit design, quickly complete the sequencing coding, and capture images of the LED light string, and thereby operating and controlling diversified lighting modes of the LED light string.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
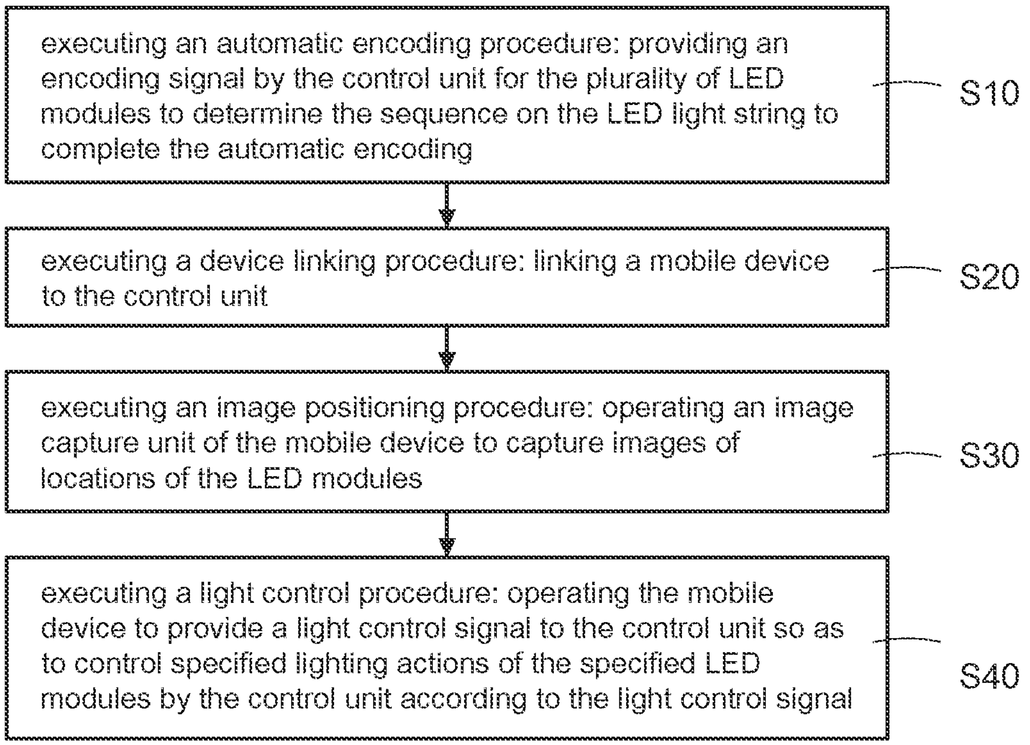
FIG. 1 is a flowchart of a method of controlling a light-emitting diode (LED) light string according to the present disclosure.

Reference will now be made to the drawing figures to describe the present disclosure in detail. It will be understood that the drawing figures and exemplified embodiments of present disclosure are not limited to the details thereof.

Figure 4:
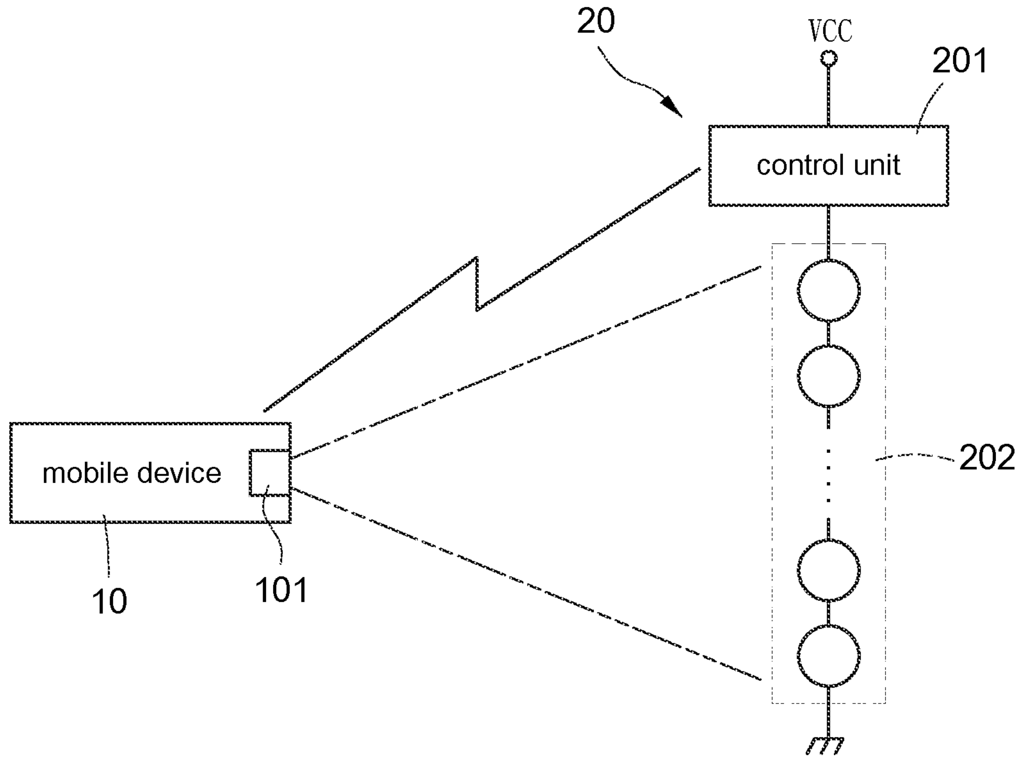
FIG. 4 is a schematic block diagram of a LED light string based on an image capture according to a first embodiment of the present disclosure.
Figure 5:
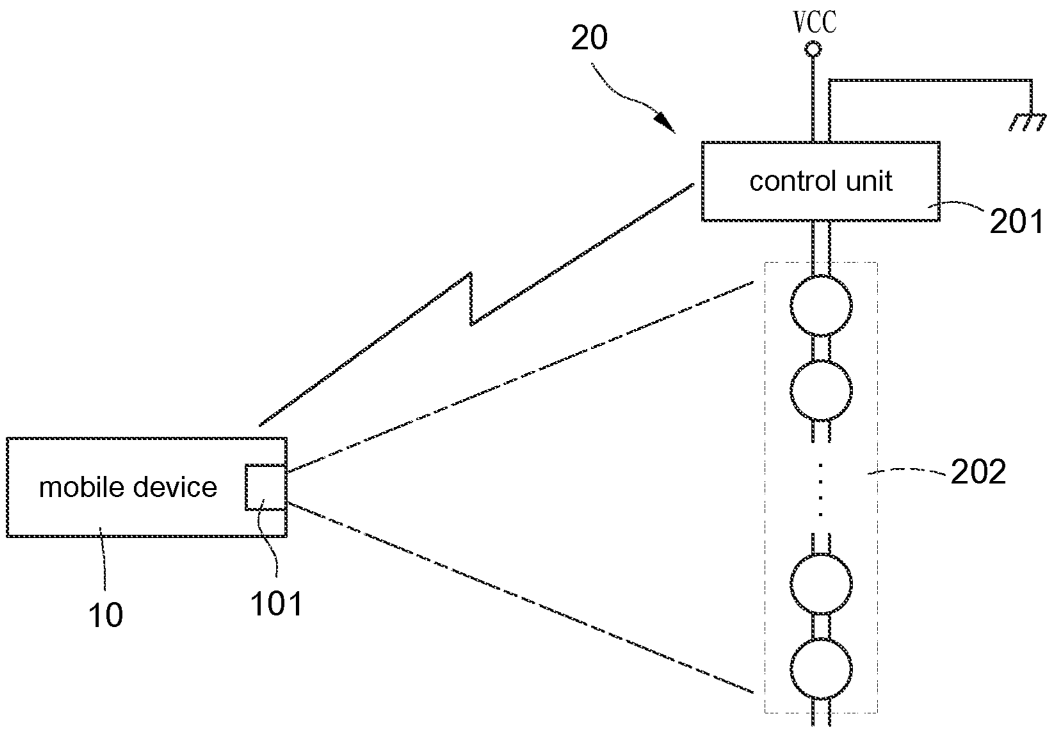
FIG. 5 is a schematic block diagram of the LED light string based on the image capture according to a second embodiment of the present disclosure.
Figure 6:
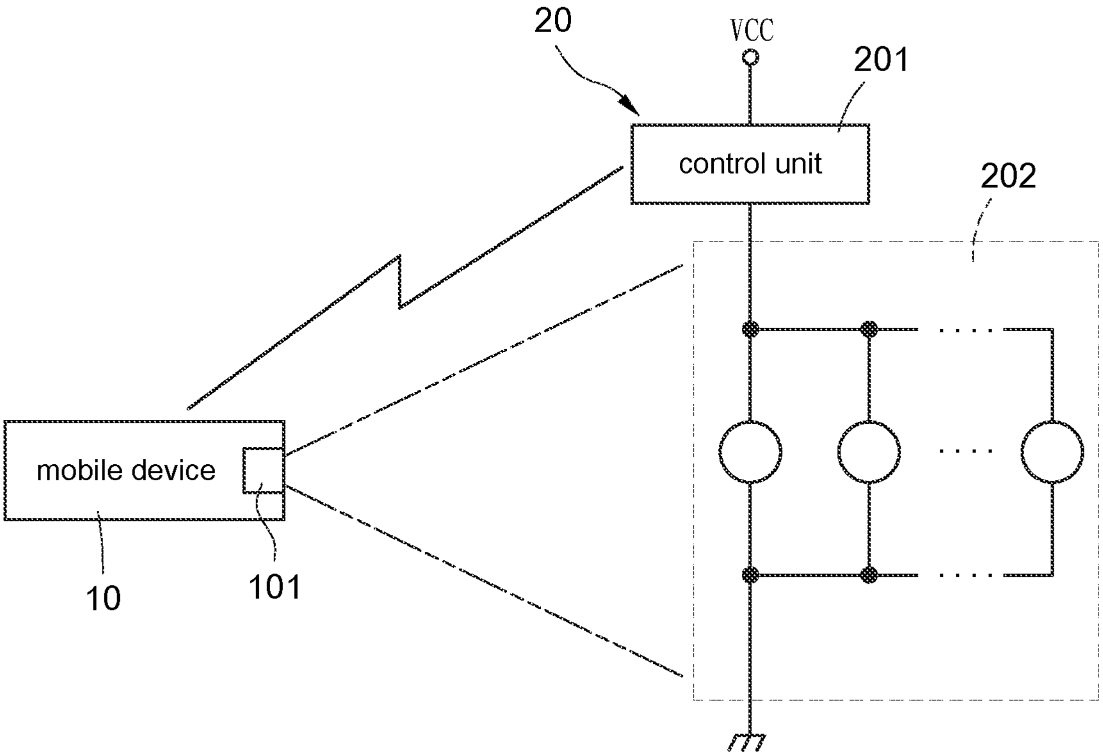
FIG. 6 is a schematic block diagram of the LED light string based on the image capture according to a third embodiment of the present disclosure.
Figure 7:
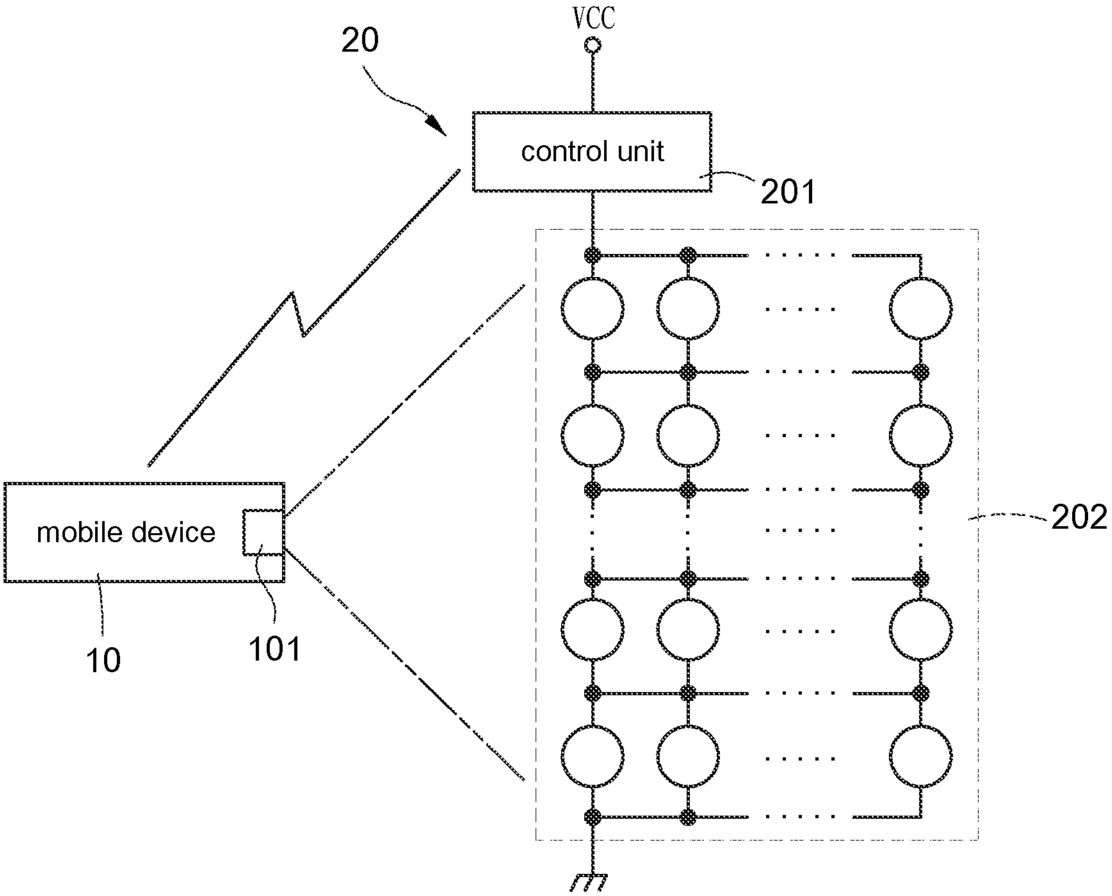
FIG. 7 is a schematic block diagram of the LED light string based on the image capture according to a fourth embodiment of the present disclosure.
Figure 8:
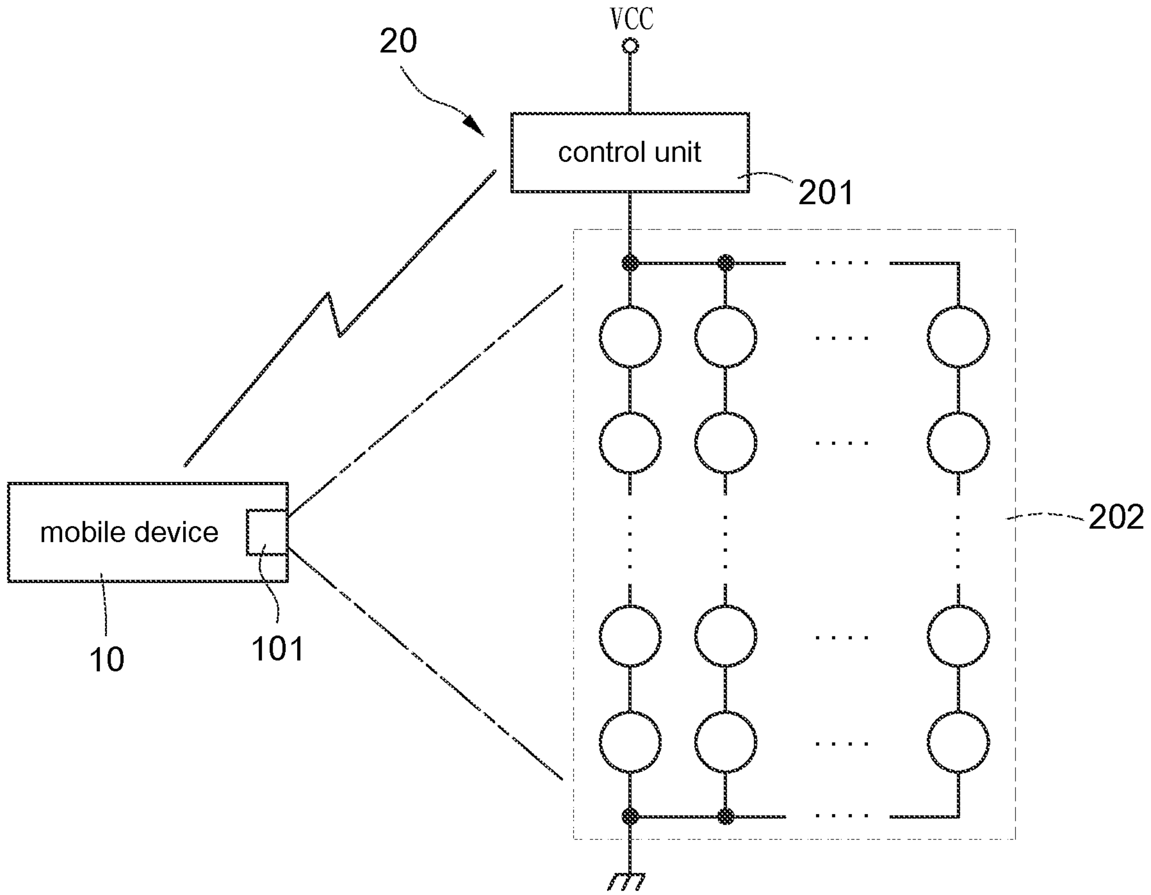
FIG. 8 is a schematic block diagram of the LED light string based on the image capture according to a fifth embodiment of the present disclosure.

Please refer to FIG. 1, which shows a flowchart of a method of controlling a light-emitting diode (LED) light string according to the present disclosure, and also refer to schematic block diagrams the LED light string according to different embodiments of the present disclosure shown in FIG. 4 to FIG. 8. The LED light string 20 includes a plurality of LED modules 202 and a control unit 201. The LED modules 202 are electrically connected to the control unit 201, and are supplied power and driven by a drive voltage VCC. In particular, the main difference between the five embodiments shown in FIG. 4 to FIG. 8 is that the circuit shapes and connection manners of the plurality of LED modules 202 are different. Specifically, FIG. 4 and FIG. 5 show series-connected manners, FIG. 6 shows a parallel-connected manner, FIG. 7 shows a parallel-series-connected manner, and FIG. 8 shows a series-parallel-connected manner. However, they can all be applied to the method of controlling the LED light string based on the image capture proposed by the present disclosure.

Taking the example of FIG. 4, each of the LED modules 202 is a two-wired lamp, and the LED modules 202 are connected in series. In one embodiment, the operation of image capture is implemented by mobile devices, where mobile devices may be smartphones, tablets, wearable devices, etc. The mobile device 10 at least has a photography or camera lens capable of capturing images, which is collectively referred to as an image capture unit.

The method of controlling the LED light string includes steps of: first, executing an automatic encoding procedure (step S10), that is, the control unit 201 of the LED light string 2 provides an encoding signal for the LED modules 202 to determine their sequence on the LED light string to complete the automatic encoding.

Afterward, executing a device linking procedure (step S20), that is, the mobile device 10 is connected/linked to the control unit 201 of the LED light string 2. In one embodiment, the mobile device 10 may send a wireless signal, such as a Wi-Fi signal, a Bluetooth signal, or a ZigBee signal to connect with the control unit 201. In particular, the order of step S10 and step S20 mentioned above is not intended to limit the present disclosure, which means that the device linking procedure may be executed earlier than the automatic encoding procedure.

Afterward, executing an image positioning procedure (step S30), that is, an image capture unit 101 of the mobile device 10 is operated to capture images of locations of the LED modules 202. In the image positioning procedure, the positions of the LED modules 202 can be captured through the image capture unit 101, such as the lens on the mobile device 10, by taking photographs (dynamic) or taking photos (static) to implement capturing images of locations of the LED modules 202. Therefore, location information of the locations of the LED modules is generated according to the results of taking photographs or taking photos. In particular, the location information is a graphical information or a textual information. For example, the graphical location information is the relevant information after capturing the image of location of each LED module, which can include the relative position, size, shape, etc. in frames. The textual information is the location information of each LED module after capturing the image of location of each LED module, and its relative position, size, shape, etc. in frames are recorded in text. In particular, the textual information is not limited by its format and can be read and used by the developed application (app).

Figure 9:
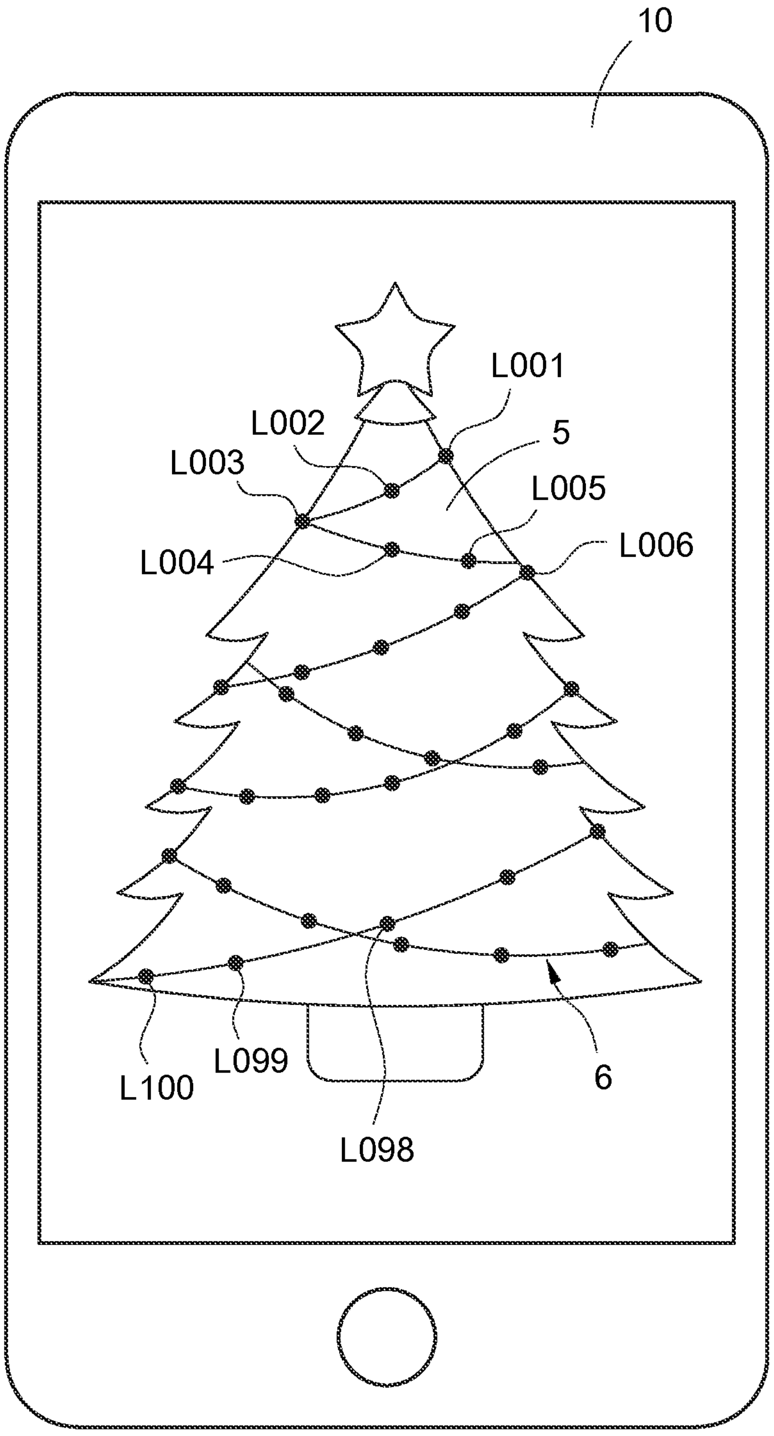
FIG. 9 is a schematic diagram of controlling the LED light string by a mobile device according to the present disclosure.

Please refer to FIG. 9, which shows a schematic diagram of controlling the LED light string by a mobile device according to the present disclosure. Based on the above disclosure, the user can operate the image capture unit 101 of the mobile device 10 (not shown in FIG. 9). Taking static photos as an example, the object captured by the image capture unit 101 is hung on an ornament 5, such as, but not limited to the LED light string 6 on a Christmas tree. The images of locations of the LED modules are displayed on a screen, such a touch screen of the mobile device 10.

After the imaging is completed, a generated image activation signal includes effective and actual location information of the LED module after detected, compared and determined. This means that based on the captured image determination, information that does not belong to the LED module is excluded and filtered out so as to completely record the location information of all LED modules.

Similarly, for dynamic photographs, the user operates the image capture unit 101 of the mobile device 10 to acquire continuous frames of the LED modules of the LED light string 6 on the ornament 5. Therefore, it can also completely record the location information of all LED modules based on the detected, compared and determined continuous frames.

Therefore, no matter whether the LED modules 202 of the LED light string 20 are hung in regular or irregular locations on the ornament 5, the LED modules 202 can be dynamic imaging or static imaging to acquire the complete location information of the LED modules 202.

The two-wired lamp shown in FIG. 4 is in a series structure (that is, the LED modules 202 form a series-connected LED light string), or the four-wired lamp shown in FIG. 5 is in a series structure (that is, the LED modules 202 form a series-connected LED light string. In the automatic encoding procedure, the sequence of the LED modules 202 is determined according to different time difference values to achieve the automatic encoding, as detailed below.

Figure 2:
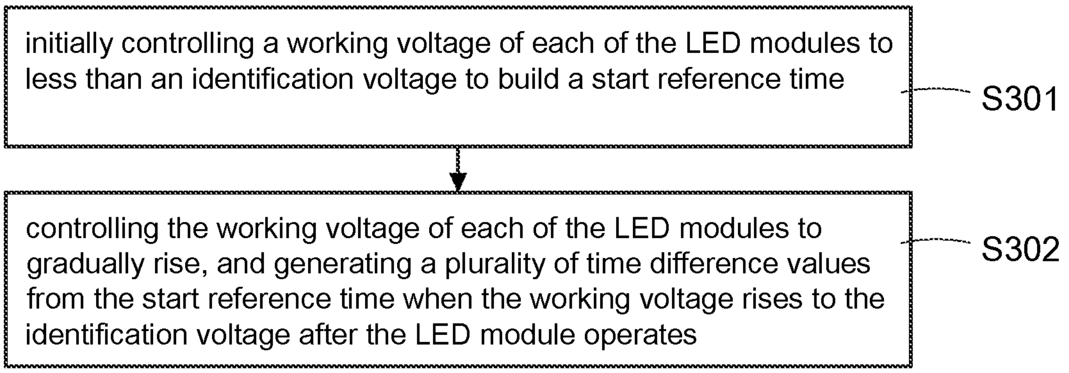
FIG. 2 is a flowchart of series automatic sequence according to the present disclosure.

Please refer to FIG. 2, which shows a flowchart of series automatic sequence according to the present disclosure. For the series-connected LED light string, the automatic encoding is performed in the form of time difference values in the present disclosure. The method includes steps of: initially controlling a working voltage of each of the LED modules to less than an identification voltage to build a start reference time (step S301), and controlling the working voltage of each of the LED modules to gradually rise, and generating a plurality of time difference values from the start reference time when the working voltage rises to the identification voltage after the LED module operates (step S302).

Figure 10:
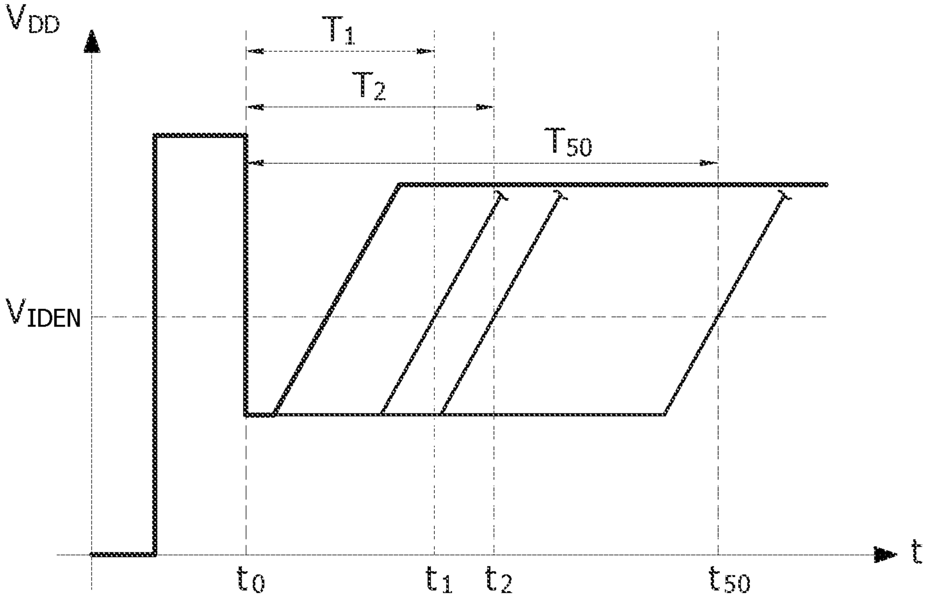
FIG. 10 is a schematic waveform diagram of automatically sequencing by calculating time difference values according to the present disclosure.

Specifically, take the series-connected LED light string shown in FIG. 10 as an example, and it is assumed that the number of LED modules is 50 (or take 100 LED modules L001 to L100 shown in FIG. 9 as an example). Each LED module 202 includes an identification circuit. In this embodiment, the identification circuit includes, for example, but not limited to, diode(s), switch(es), and resistor(s) connected in series. For example, the forward bias voltage of the three series-connected diodes is 2.1 volts (each is 0.7 volts), plus the 0.7-volt forward bias voltage of the switch is a total forward bias voltage of 2.8 volts. When the external DC driving voltage $V_{DD}$ gradually increases and has not yet reached but is close to 2.8 volts (for example, but not limited to 2.6 volts), the switch is turned off so that the DC driving voltage $V_{DD}$ instantaneously decreases and is less than an identification voltage $V_{IDEN}$.

Before the start reference time $t_0$, since the switch is turned on, the DC driving voltage $V_{DD}$ instantaneously increases, and all LED modules become a high potential state. At the start reference time $t_0$, the switch is turned off, and the DC driving voltage $V_{DD}$ instantaneously decreases. As shown in FIG. 10, when the DC driving voltage $V_{DD}$ instantaneously decreases and is less than the identification voltage $V_{IDEN}$, the time at that instant is set (defined) as the start reference time $t_0$.

At this condition, the switching switch is switched from a path composed of the series-connected diodes and the switch to a path composed of the resistor. At this time, the time is recorded as the start reference time $t_0$, and the start reference time $t_0$ is used as a reference time of calculating time difference values. When the voltages of the plurality of LED modules gradually increase to reach the identification voltage $V_{IDEN}$, the plurality of time difference values of the LED modules can be acquired. Take the first LED module as an example, a first time difference is $T_1=t_1-t_0$.

At this condition, the voltage waveforms of the positive voltage ends of all 50 LED modules relative to the negative voltage ends (hereinafter referred to as the relative voltage waveforms) are as shown in FIG. 10. According to the circuit characteristics as shown in FIG. 10, that is, for different LED modules, the 50 sets of relative voltage waveforms have an obvious positive correlation with their series-connected sequence. Therefore, according to this circuit characteristic, the automatic sequence of all 50 LED modules can be achieved through the calculation of time difference values.

Specifically, since the relative voltage waveforms are the voltage characteristics of individual LED modules, all (50 sets) of relative voltage waveforms may be used to effectively determine the sequence of the corresponding LED modules, the concept of start reference (base) time is introduced. That is, by calculating the time difference between the time of each relative voltage waveform and the start reference time, a plurality of different time difference values can be acquired. As shown in FIG. 10, since the DC driving voltage $V_{DD}$ gradually increases and the voltage of the first LED module reaches the identification voltage $V_{IDEN}$, a time difference value from the start reference time $t_0$ to the time when the voltage of the first LED module reaches the identification voltage $V_{IDEN}$ is the first time difference value $T_1$. Similarly, since the DC driving voltage $V_{DD}$ gradually increases and the voltage of the second LED module reaches the identification voltage $V_{IDEN}$, a time difference value from the start reference time $t_0$ to the time when the voltage of the second LED module reaches the identification voltage $V_{IDEN}$ is the second time difference value $T_2$. The rest may be deduced by analogy, since the DC driving voltage $V_{DD}$ gradually increases and the voltage of the 50th LED module reaches the identification voltage $V_{IDEN}$, a time difference value from the start reference time $t_0$ to the time when the voltage of the $50^{th}$ LED module reaches the identification voltage $V_{IDEN}$ is the $50^{th}$ time difference value $T_{50}$.

In other words, the switch is first turned on, and the DC driving voltage $V_{DD}$ instantaneously increases, and afterward, the switch is turned off so that the DC driving voltage $V_{DD}$ instantaneously decreases and the relative voltage waveforms of the LED modules may overlap on the same line at the start reference time $t_0$. Therefore, the start reference time $t_0$ is used as the reference time of calculating time difference values. Accordingly, the start reference time $t_0$ can be defined and recorded, and time difference values $T_1$-$T_{50}$ of the corresponding LED modules can be acquired based on the start reference time $t_0$.

Furthermore, by building a lookup table in each of the LED modules, the identification and determination of sequencing the LED modules can be implemented. For example, the circuit designer may build the lookup table in advance according to the sequence of the LED modules according to the size (range) of the time difference values (ranges).

As the following table, an implement of the lookup table is exemplified. Take 50 LED modules (or take 100 LED modules L001 to L100 shown in FIG. 9 as an example) as an example to illustrate.

| sequence | time difference values/ranges (μs) |
|---|---|
| #1 | 6-8 |
| #2 | 8-10 |
| #3 | 10-12 |
| #4 | 12-14 |
| #5 | 14-16 |
| #6 | 16-18 |
| . . . | . . . |
| #50 | 104-106 |

Therefore, after each LED module $LED_1$-$LED_N$ operates, all LED modules $LED_1$-$LED_N$ can be sequenced according to the acquired time difference values corresponding to the sequence in the built-in lookup table. For example, when the time difference value of 12.95 μs of the LED module is acquired, the LED module is determined to be the fourth LED module according to the built-in lookup table. Similarly, when the time difference value of 17.08 μs of the LED module is acquired, the LED module is determined to be the sixth LED module according to the built-in lookup table. The rest may be deduced by analogy. Therefore, the sequence of the LED modules can be determined according to the time difference values to achieve an automatic sequencing function.

Therefore, the automatic encoding for the series-connected LED light string can be implemented by using the plurality of time difference values. The automatic encoding can be performed based on the complete location information of the LED modules 202 captured by the image capture unit 101 to assign the sequence to each LED module 202.

The two-wired lamp shown in FIG. 6 is in a parallel structure (that is, the LED modules 202 form a parallel-connected LED light string). In the automatic encoding procedure, each LED module is in a low current and high impedance state, and a constant current device is provided at the end of the circuit to pass large current, or the controller enters a constant current mode, and the voltage of each LED module is different through wire resistances or additional small resistors to distinguish the sequence to achieve the automatic encoding, as detailed below.

Figure 3:
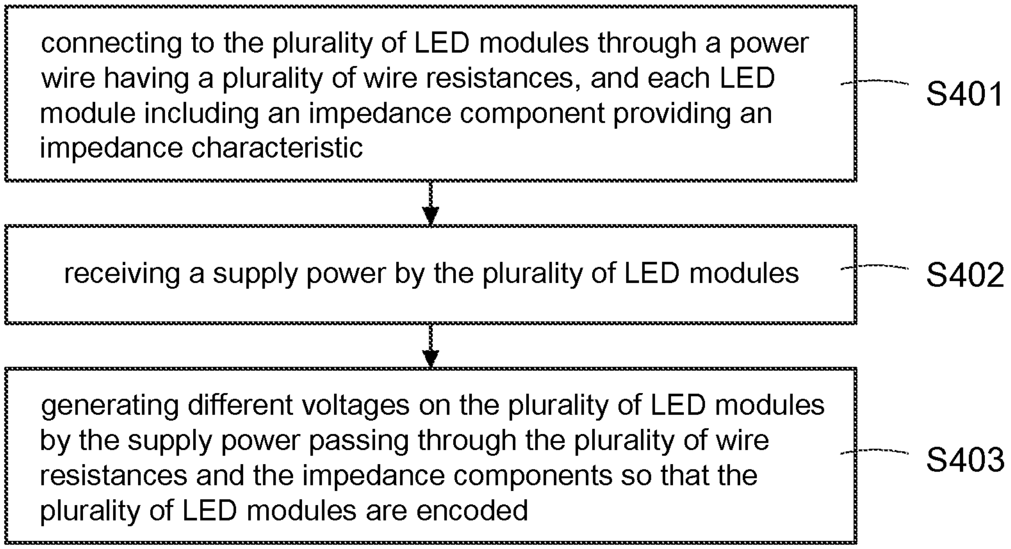
FIG. 3 is a flowchart of parallel automatic sequence according to the present disclosure.

Please refer to FIG. 3, which shows a flowchart of parallel automatic sequence according to the present disclosure. For the parallel-connected LED light string, the automatic encoding is performed by the supply power passing through the plurality of wire resistances and the impedance components to generate different voltages on each LED module. The method includes steps of: connecting to the plurality of LED modules through a power wire having a plurality of wire resistances, and each LED module comprising an impedance component providing an impedance characteristic (step S401); receiving a supply power by the plurality of LED modules (step S402); generating different voltages on the plurality of LED modules by the supply power passing through the plurality of wire resistances and the impedance components so that the plurality of LED modules are encoded (step S403).

Figure 11A:
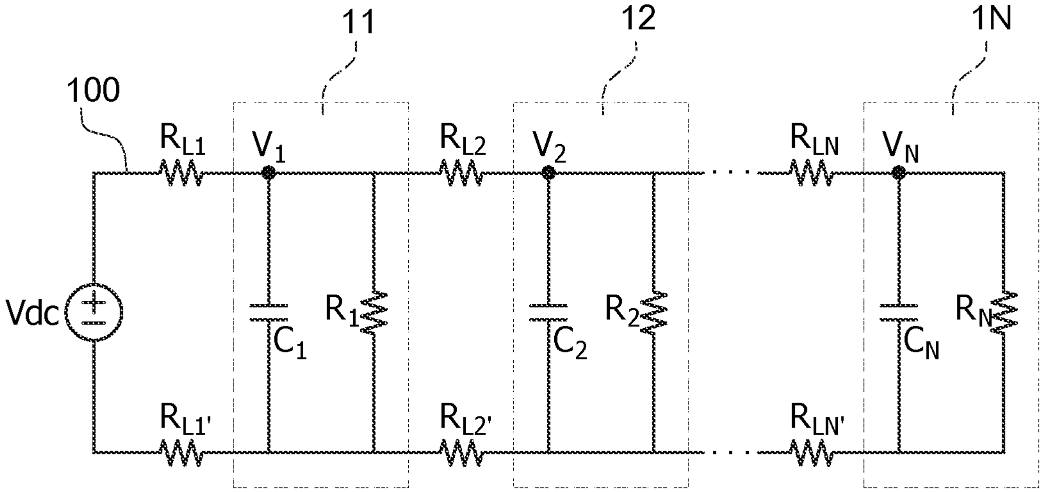
FIG. 11A is a circuit diagram of the parallel sequenced LED light string supplied power by a constant-voltage source according to a first embodiment of the present disclosure.

Specifically, please refer to FIG. 11A, which shows a circuit diagram of the parallel sequenced LED light string supplied power by a constant-voltage source according to a first embodiment of the present disclosure. The parallel sequenced LED light string includes a plurality of (N) LED modules 11, 12, . . . , 1N. The LED modules 11, 12, . . . , 1N are connected in parallel through a power wire 10. In terms of actual conditions, the power wire 10 has a plurality of wire resistances $R_{L1}$, $R_{L2}$, . . . , $R_{LN}$, $R_{L1'}$, $R_{L2'}$, . . . , $R_{LN'}$. Each of the LED modules 11, 12, . . . , 1N has a resistance $R_1$, $R_2$, . . . , $R_N$ and a parasitic capacitor $C_1$, $C_2$, . . . , $C_N$ in parallel with the corresponding resistance $R_1$, $R_2$, . . . , $R_N$. That is, a first LED module 11 has a first resistance $R_1$ and a first parasitic capacitor $C_1$ connected in parallel, a second LED module 12 has a second resistance $R_2$ and a second parasitic capacitor $C_2$ connected in parallel, . . . , and a Nth LED module 1N has a Nth resistance $R_N$ and a Nth parasitic capacitor $C_N$ connected in parallel. As shown in FIG. 11A, the parallel-connected LED modules 11, 12, . . . , 1N receive a supply power Vdc. In this embodiment, the supply power Vdc is a constant-voltage source for providing a voltage source with a constant voltage value. The LED modules 11, 12, . . . , 1N respectively get different voltages through the wire resistances $R_{L1}$, $R_{L2}$, . . . , $R_{LN}$, $R_{L1'}$, $R_{L2'}$, . . . , $R_{LN'}$ and the resistances $R_1$, $R_2$, . . . , $R_N$ of the LED modules 11, 12, . . . , 1N from the supply power Vdc.

After the time of power-on, the supply power Vdc supplies power to the LED modules 11, 12, . . . , 1N. Due to the voltage difference caused by the current flowing through the wire resistances $R_{L1}$, $R_{L2}$, . . . , $R_{LN}$, the voltages generated on the LED modules 11, 12, . . . , 1N are different. In this embodiment, the voltage difference caused by the supply power Vdc of the constant-voltage source through the wire resistances $R_{L1}$, $R_{L2}$, . . . , $R_{LN}$ is the voltage drop. Please refer to FIG. 11E, which shows a schematic voltage diagram of the parallel sequenced LED light string according to a first embodiment of the present disclosure. A first voltage $V_1$ on the first LED module 11 is greater than a second voltage $V_2$ on the second LED module 12, the second voltage $V_2$ is greater than a third voltage $V_3$ on the third LED module 13, and the rest may be deduced by analogy. The voltage generated by the front (up-stream) LED module is greater than the voltage generated by the rear (down-stream) LED module, i.e., $V_1 > V_2 > \ldots > V_N$. Accordingly, the LED modules 11, 12, . . . , 1N are sequenced according to the different generated voltages $V_1$, $V_2$, . . . , $V_N$. In the following, the different generated voltages $V_1$, $V_2$, . . . , $V_N$ and the sequence principle of the LED modules 11, 12, . . . , 1N are described.

In one embodiment, it can be implemented by means of a built-in corresponding look-up table. For example, the circuit designer may build the look-up table in advance according to the supply power Vdc, the number of the LED modules 11, 12, . . . , 1N, the (estimated) wire resistances $R_{L1}$, $R_{L2}$, . . . , $R_{LN}$, and the resistances $R_1$, $R_2$, . . . , $R_N$ for the different generated voltages $V_1$, $V_2$, . . . , $V_N$, thereby sequencing the LED modules 11, 12, . . . , 1N.

The following is an implementation of the look-up table, in which 100 LED modules 11, 12, . . . , 1N are taken as an example for description.

| sequence of the LED modules | voltage ranges (volts) |
|---|---|
| #1 | 5.10-4.90 |
| #2 | 4.90-4.70 |
| #3 | 4.70-4.54 |

-continued

| sequence of the LED modules | voltage ranges (volts) |
|---|---|
| #4 | 4.54-4.38 |
| #5 | 4.38-4.26 |
| #6 | 4.26-4.14 |
| . . . | . . . |
| #100 | 2.36-2.32 |

For example, when the voltage (for example, the first voltage $V_1$) acquired by a certain LED module (for example, the first LED module 11) is 5.00 volts, since the voltage is within the voltage range (5.10-4.90 volts) of the first sequence (#1), the LED module is sequenced as the first LED module 11. Similarly, when the voltage (for example, the second voltage $V_2$) acquired by a certain LED module (for example, the second LED module 12) is 4.80 volts, since the voltage is within the voltage range (4.90-4.70 volts) of the second sequence (#2), the LED module is sequenced as the second LED module 12. Similarly, when the voltage (for example, the sixth voltage V6) acquired by a certain LED module (for example, the sixth LED module 16) is 4.20 volts, since the voltage is within the voltage range (4.26-4.14 volts) of the sixth sequence (#6), the LED module is sequenced as the sixth LED module 16.

Figure 11B:
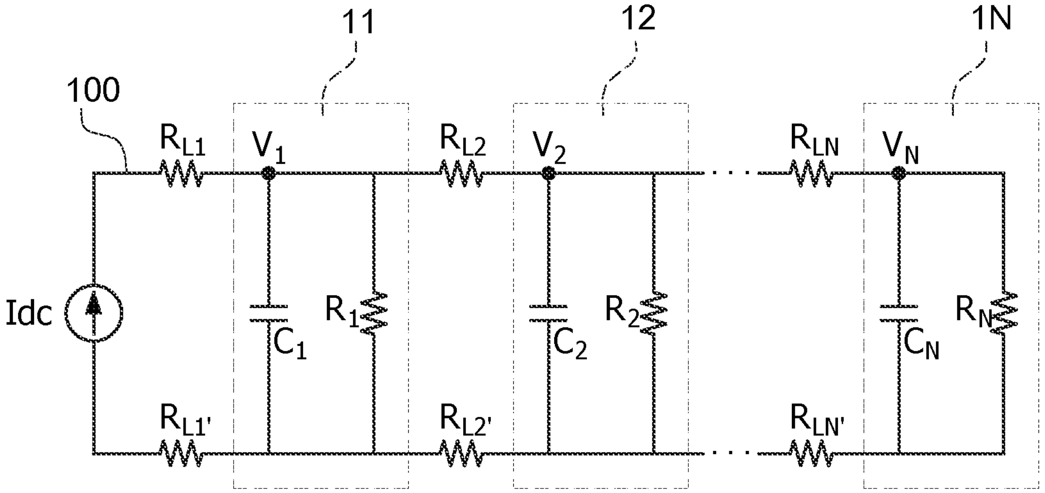
FIG. 11B is a circuit diagram of the parallel sequenced LED light string supplied power by a constant-current source according to a first embodiment of the present disclosure.

Please refer to FIG. 11B, which shows a circuit diagram of the parallel sequenced LED light string supplied power by a constant-current source according to a first embodiment of the present disclosure. In addition to realizing the supply power Vdc in the form of a constant voltage source, the present disclosure can also be implemented in the form of a constant current source. That is, in the embodiment, the supply power Idc is a constant current source for providing a current source with a fixed current magnitude. In the present disclosure, the supply power may be any form of DC supply power, such as a constant voltage source, a constant current source, a pulse power source, or a carrier power source.

After the time of power-on, the supply power Idc supplies power to the LED modules 11, 12, . . . , 1N. Due to the voltage difference caused by the current flowing through the wire resistances $R_{L1}$, $R_{L2}$, . . . , $R_{LN}$, the voltages generated on the LED modules 11, 12, . . . , 1N are different. In this embodiment, the voltage difference caused by the power supply Idc of the constant-current source through the wire resistances $R_{L1}$, $R_{L2}$, . . . , $R_{LN}$ is the voltage rise. Please refer to FIG. 11F, which shows a schematic voltage diagram of the parallel sequenced LED light string according to a second embodiment of the present disclosure. A first voltage $V_1$ on the first LED module 11 is less than a second voltage $V_2$ on the second LED module 12, the second voltage $V_2$ is less than a third voltage $V_3$ on the third LED module 13, and the rest may be deduced by analogy. The voltage generated by the front (up-stream) LED module is less than the voltage generated by the rear (down-stream) LED module, i.e., $V_1<V_2< \ldots <V_N$. Accordingly, the LED modules 11, 12, . . . , 1N are sequenced according to the different generated voltages $V_1$, $V_2$, . . . , $V_N$. In the following, the different generated voltages $V_1$, $V_2$, . . . , $V_N$ and the sequence principle of the LED modules 11, 12, . . . , 1N are described.

Figure 11C:
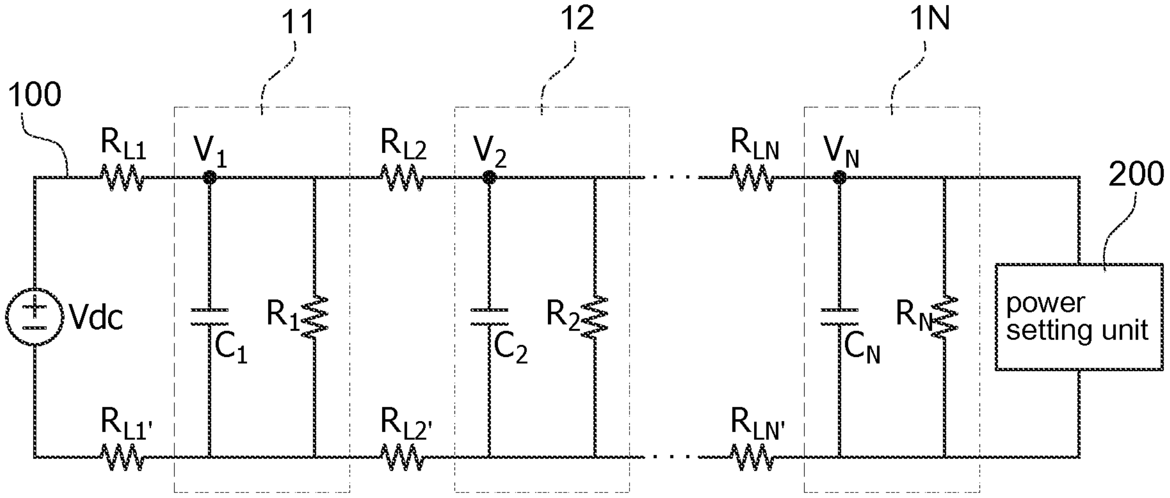
FIG. 11C is a circuit diagram of the parallel sequenced LED light string supplied power by the constant-voltage source according to a second embodiment of the present disclosure.
Figure 11D:
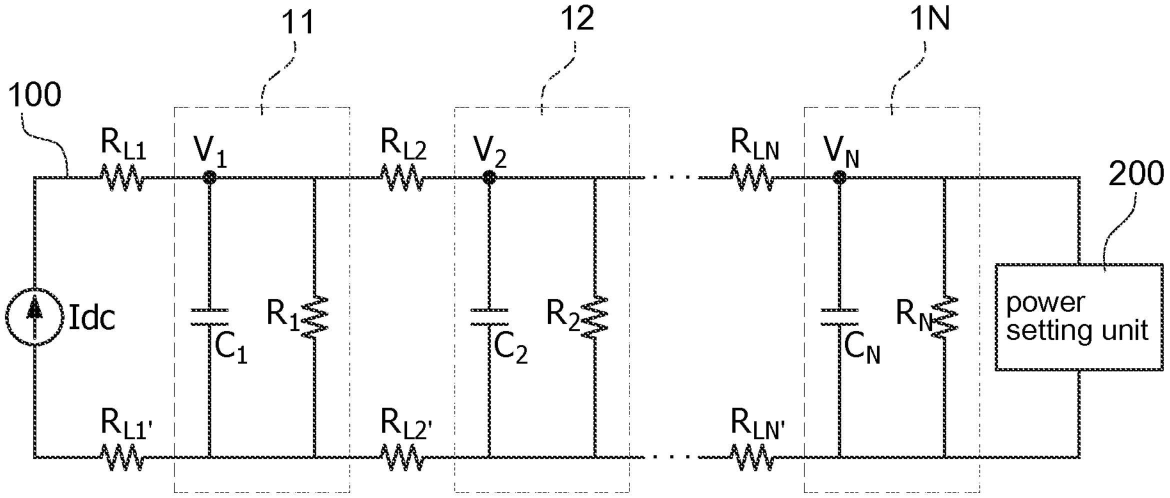
FIG. 11D is a circuit diagram of the parallel sequenced LED light string supplied power by the constant-current source according to a second embodiment of the present disclosure.
Figure 11E:
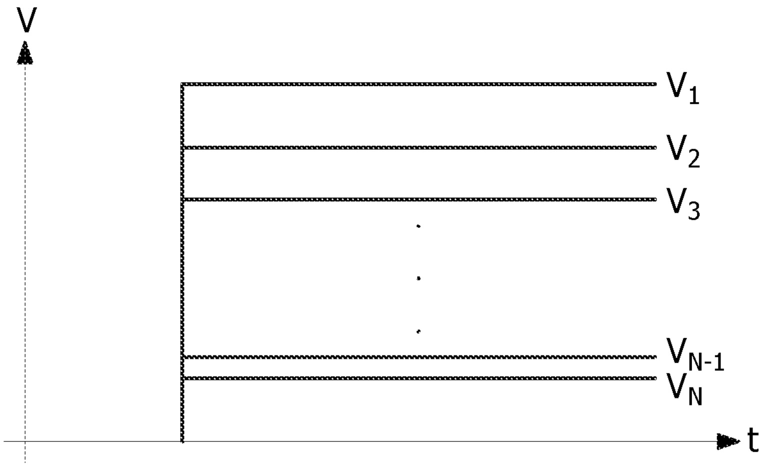
FIG. 11E is a schematic voltage diagram of the parallel sequenced LED light string according to a first embodiment of the present disclosure.
Figure 11F:
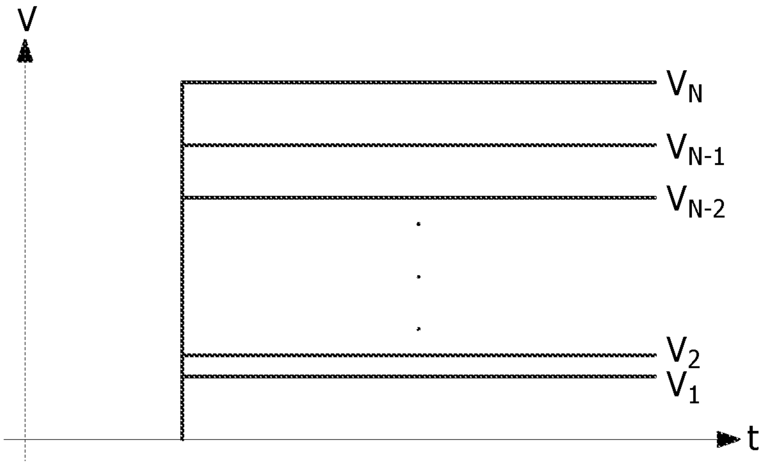
FIG. 11F is a schematic voltage diagram of the parallel sequenced LED light string according to a second embodiment of the present disclosure.

Please refer to FIG. 11C and FIG. 11D, which respectively show a circuit diagram of the parallel sequenced LED light string supplied power by the constant-voltage source according to a second embodiment of the present disclosure and a circuit diagram of the parallel sequenced LED light string supplied power by the constant-current source according to a second embodiment of the present disclosure. For convenience of explanation, FIG. 11C that provides a constant voltage source is also taken as an example, and it is applicable to the supply power Idc that provides a constant current source in FIG. 11D and will not be described again.

The major difference between the LED light string shown in FIG. 11C and the LED light string shown in FIG. 11A is that the resistance value of each LED module 11, 12, . . . , 1N in the LED light string of FIG. 11C does not have the controllable characteristics as shown in FIG. 11A. Therefore, in order to achieve the effect of resistance compensation, the LED light string shown in FIG. 11C further includes a power setting unit 200 to replace the controllable adjustment of the resistance in each LED module 11, 12, . . . , 1N as shown in FIG. 11A. In other words, the compensation manner with adjustable resistance (that is, the resistance is controllable) shown in FIG. 11A and FIG. 11B will be implemented by the power setting unit 200. Therefore, not only simplify the circuit control, but also save the circuit costs. In particular, the power setting unit 200 is an integrated circuit (IC), which has a counting function, or the power setting 200 is a circuit self-designed by an analog circuit and a digital circuit, which has a counting function.

In one embodiment, two terminals of the power setting unit 200 are coupled to a positive terminal and a negative of the power wire 100 for adjusting the current of the input power source to a constant current or the voltage of the input power source to a constant voltage. The power setting unit 200 can be designed to be enabled under the sequence mode, and the power setting circuit 2 can be designed to be disabled under the work mode. Therefore, in the sequence mode, a closed loop is provided from a positive electrode of the input power source, the power wire 100, the power setting unit 200 to a negative electrode of the input power source since the power setting unit 200 is enabled (turned on). In the work mode, the power setting unit 200 is disabled so that the power setting unit 200 does not work to save the power consumption of the LED light string 100.

Please refer to FIG. 11C, when the power is turned on for the first time, since the resistances $R_1$, $R_2$, . . . , $R_N$ are connected in parallel, the equivalent resistance value is the smallest so the current flowing through is the largest. The magnitude of the first voltage $V_1$ corresponding to the first sequence (first cycle) of the pulse signal can be acquired. When the (first time) power-on is finished, the first resistance $R_1$ is turned off and the impedance of the compensation unit 200 is decreased (i.e., the impedance compensation of the compensation unit 200 is performed) so that the equivalent resistance values after the parallel connection will be the same and the current flowing through may be the same. When the power is turned on again, the magnitude of the second voltage $V_2$ corresponding to the second sequence (second cycle) of the pulse signal can be acquired.

Similarly, when the (second time) power-on is finished, the first resistance $R_1$ and the second resistance $R_2$ are turned off and the impedance of the power setting unit 200 is further decreased so that the equivalent resistance values after the parallel connection will be the same. In other words, when both the first resistance $R_1$ and the second resistance $R_2$ are turned off, the impedance of the power setting unit 200 is smaller than the impedance when only the first resistance $R_1$ is turned off so that the current flowing through may be the same. When the power is turned on again, the magnitude of the second voltage $V_3$ corresponding to the third sequence (third cycle) of the pulse signal can be acquired. Accordingly, the sequence signal may be used as the basis of the sequence, and the impedance of the power setting unit 200 is adjusted (decreased) to maintain the same current so that the voltage difference between any two LED modules is maintained constant, thereby increasing the accuracy of identifying the detected voltage.

In comparison with the constant-voltage power supply shown in FIG. 11C, the impedance compensation of the constant-current power supply shown in FIG. 11D is to increase the impedance of the power setting unit 200 so that the equivalent resistance values after the parallel connection will increase and the current flowing through is decreased. Accordingly, the sequence signal may be used as the basis of the sequence, and the impedance of the power setting unit 200 is adjusted (increased) to maintain the same current so that the voltage difference between any two LED modules is maintained constant, thereby increasing the accuracy of identifying the detected voltage.

Therefore, the automatic encoding for the parallel-series-connected LED light string shown in FIG. 7 or the automatic encoding for the series-parallel-connected LED light string shown in FIG. 8 can be implemented by using the plurality of time difference values (for series-connected part) and by passing the supply power through the plurality of wire resistances and the impedance components to generate different voltages on each LED module (for parallel-connected part) based on the complete location information of the LED modules 202 to assign the sequence to each LED module 202.

Finally, executing a light control procedure (step S40), that is, the user can operate the mobile device 10 to provide a light control signal to the control unit 201 so as to control specified lighting actions of the specified LED modules by the control unit 201 according to the light control signal. In the light control procedure, specified lighting actions of specified LED modules are controlled.

Specifically, the user can determine the lighting effect according to the lighting effect that the LED module 202 of the LED light string 20 wants to produce, such as continuous lighting, color change, fast flashing, slow flashing, marquee, etc.), which can be controlled for the specified LED module 202. For example, the user can directly select the LED module 202 to be controlled on the touch screen in a graphical manner and specify its lighting effect. At the same time, another part of the LED module 202 can also be selected and its different lighting effects can be specified. Therefore, the LED light string 20 can be operated and controlled in various lighting modes.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of controlling a light-emitting diode light string, the light-emitting diode light string comprising a plurality of light-emitting diode modules and a control unit, the method comprising steps of:

executing an automatic encoding procedure: providing an encoding signal by the control unit for the plurality of light-emitting diode modules to determine the sequence on the light-emitting diode light string to complete the automatic encoding, executing a device linking procedure: linking a mobile device to the control unit, executing an image positioning procedure: operating an image capture unit of the mobile device to capture static or dynamic images of locations of the light-emitting diode modules relative to each other on the light-emitting diode light string, wherein the image positioning procedure is performed without calculating a distance and a direction in space between the mobile device and each of the light-emitting diode modules of the light-emitting diode light string, and executing a light control procedure: operating the mobile device to provide a light control signal to the control unit so as to control specified lighting actions of the specified light-emitting diode modules by the control unit according to the light control signal.

2. The method of controlling the light-emitting diode light string as claimed in claim 1, wherein in the image positioning procedure, a location information of the locations of the plurality of light-emitting diode modules is generated according to the results of capturing images.

3. The method of controlling the light-emitting diode light string as claimed in claim 2, wherein the location information is a graphical information or a textual information.

4. The method of controlling the light-emitting diode light string as claimed in claim 3, wherein in the light control procedure, specified lighting actions of specified light-emitting diode modules are controlled.

5. The method of controlling the light-emitting diode light string as claimed in claim 1, wherein the plurality of light-emitting diode modules forms a series-connected light-emitting diode light string, and the automatic encoding procedure is a series-connected automatic encoding procedure correspondingly.

6. The method of controlling the light-emitting diode light string as claimed in claim 5, wherein in the series-connected automatic encoding procedure, the sequence of the plurality of light-emitting diode modules is determined according to different time difference values to achieve the automatic encoding.

7. The method of controlling the light-emitting diode light string as claimed in claim 6, further comprising steps of:

initially controlling a working voltage of each of the light-emitting diode modules to less than an identification voltage to build a start reference time, and controlling the working voltage of each of the light-emitting diode modules to gradually rise, and generating a plurality of time difference values from the start reference time when the working voltage rises to the identification voltage after the light-emitting diode module operates.

8. The method of controlling the light-emitting diode light string as claimed in claim 6, wherein the time difference values are compared with a plurality of time difference ranges to determine the sequence of the light-emitting diode modules.

9. The method of controlling the light-emitting diode light string as claimed in claim 1, wherein the plurality of light-emitting diode modules forms a parallel-connected light-emitting diode light string, and the automatic encoding procedure is a parallel-connected automatic encoding procedure correspondingly.

10. The method of controlling the light-emitting diode light string as claimed in claim 9, wherein in the parallel-connected automatic encoding procedure, the sequence of the plurality of light-emitting diode modules is determined according to different voltages generated by the plurality of light-emitting diode modules to achieve the automatic encoding.

11. The method of controlling the light-emitting diode light string as claimed in claim 10, further comprising steps of:

connecting to the plurality of light-emitting diode modules through a power wire having a plurality of wire resistances, and each light-emitting diode module comprising an impedance component providing an impedance characteristic, receiving a supply power by the plurality of light-emitting diode modules, and generating different voltages on the plurality of light-emitting diode modules by the supply power passing through the plurality of wire resistances and the impedance components so that the plurality of light-emitting diode modules is encoded.

* * * * *